(12) United States Patent
Battenfeld et al.

(10) Patent No.: US 10,478,758 B2
(45) Date of Patent: *Nov. 19, 2019

(54) FILTER MEDIA WITH FIBRILLATED FIBERS

(71) Applicant: Hollingsworth & Vose Company, East Walpole, MA (US)

(72) Inventors: Juergen Battenfeld, Battenberg (DE); William E. Widrig, Ballston Spa, NY (US); Eszter Nofz, Breidenbach (DE)

(73) Assignee: Hollingsworth & Vose Company, East Walpole, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/684,726

(22) Filed: Apr. 13, 2015

(65) Prior Publication Data

US 2015/0321124 A1    Nov. 12, 2015

Related U.S. Application Data

(63) Continuation of application No. 12/971,432, filed on Dec. 17, 2010, now Pat. No. 9,027,765.

(51) Int. Cl.

| | |
|---|---|
| *B01D 29/03* | (2006.01) |
| *B01D 35/02* | (2006.01) |
| *B01D 39/18* | (2006.01) |
| *B01D 39/20* | (2006.01) |
| *D04H 1/4218* | (2012.01) |
| *D04H 1/4258* | (2012.01) |

(52) U.S. Cl.
CPC ............ *B01D 29/03* (2013.01); *B01D 35/02* (2013.01); *B01D 39/18* (2013.01); *B01D 39/2017* (2013.01); *D04H 1/4218* (2013.01); *D04H 1/4258* (2013.01); *B01D 2239/0636* (2013.01); *B01D 2239/1291* (2013.01)

(58) Field of Classification Search
CPC .................... B01D 29/03; B01D 35/02; B01D 2239/0636; B01D 2239/1291; B01D 39/18; B01D 39/2017; D04H 1/4218; D04H 1/4258
USPC ............. 55/486, 524; 96/154; 210/505, 527, 210/767; 264/203, 211.15, 233
See application file for complete search history.

(56) References Cited

U.S. PATENT DOCUMENTS

| | | |
|---|---|---|
| 3,083,118 A | 3/1963 | Bridgeford |
| 3,290,207 A | 12/1966 | Magat et al. |

(Continued)

FOREIGN PATENT DOCUMENTS

| | | |
|---|---|---|
| CN | 101380535 A | 3/2009 |
| EP | 0 572 569 B1 | 12/1994 |

(Continued)

OTHER PUBLICATIONS

International Search Report and Written Opinion for PCT/US2011/065484 dated Apr. 20, 2012.

(Continued)

*Primary Examiner* — Dirk R Bass
(74) *Attorney, Agent, or Firm* — Wolf, Greenfield & Sacks, P.C.

(57) ABSTRACT

Filter media suitable for various applications (e.g., hydraulic) and related components, systems, and methods associated therewith are described. The filter media may include a fiber web having a mixture of glass fibers and fibers that are fibrillated. The fibrillated fibers, for example, may be formed of lyocell.

17 Claims, 7 Drawing Sheets

(56) References Cited

U.S. PATENT DOCUMENTS

| | | |
|---|---|---|
| 3,441,515 A | 4/1969 | Oshida et al. |
| 3,865,732 A | 2/1975 | Terhune et al. |
| 4,639,513 A | 1/1987 | Hou et al. |
| 5,196,470 A | 3/1993 | Anderson et al. |
| 5,366,832 A | 11/1994 | Hayashi et al. |
| 5,580,459 A | 12/1996 | Powers et al. |
| 5,672,399 A | 9/1997 | Kahlbaugh et al. |
| 5,725,821 A | 3/1998 | Gannon et al. |
| 5,731,080 A | 3/1998 | Cousin et al. |
| 5,785,725 A | 7/1998 | Cusick et al. |
| 5,958,320 A | 9/1999 | Pitowski et al. |
| 5,983,469 A | 11/1999 | Beaty et al. |
| 5,997,618 A | 12/1999 | Schneider et al. |
| 6,001,639 A | 12/1999 | Schulein et al. |
| 6,042,769 A | 3/2000 | Gannon et al. |
| 6,159,601 A | 12/2000 | Pitowski et al. |
| 6,171,684 B1 | 1/2001 | Kahlbaugh et al. |
| 6,221,487 B1 | 4/2001 | Luo et al. |
| 6,235,392 B1 | 5/2001 | Luo et al. |
| 6,387,690 B1 | 5/2002 | Schulein et al. |
| 6,419,839 B1 | 7/2002 | Cox et al. |
| 6,511,930 B1 | 1/2003 | Luo et al. |
| 6,596,033 B1 | 7/2003 | Luo et al. |
| 6,660,172 B2 | 12/2003 | Koslow |
| 6,692,827 B2 | 2/2004 | Luo et al. |
| 6,706,876 B2 | 3/2004 | Luo et al. |
| 6,855,531 B2 | 2/2005 | Schulein et al. |
| 6,872,311 B2 | 3/2005 | Koslow |
| 6,939,492 B2 | 9/2005 | Jackson et al. |
| 7,008,465 B2 | 3/2006 | Graham et al. |
| 7,052,532 B1 | 5/2006 | Liu et al. |
| 7,137,510 B1 | 11/2006 | Klein et al. |
| 7,214,727 B2 | 5/2007 | Kwon et al. |
| 7,226,773 B2 | 6/2007 | Schulein et al. |
| 7,228,973 B2 | 6/2007 | Simon |
| 7,244,497 B2 | 7/2007 | Hartmann et al. |
| 7,296,691 B2 | 11/2007 | Koslow |
| 7,314,497 B2 | 1/2008 | Kahlbaugh et al. |
| 7,390,343 B2 | 6/2008 | Tepper et al. |
| 7,445,737 B2 | 11/2008 | Sanderson et al. |
| 7,534,379 B2 | 5/2009 | Ellison et al. |
| 7,534,380 B2 | 5/2009 | Ellison et al. |
| 7,655,112 B2 | 2/2010 | Koslow |
| 7,670,678 B2 | 3/2010 | Phan |
| 8,012,312 B2 | 9/2011 | Goto et al. |
| 8,882,876 B2 | 11/2014 | Battenfeld et al. |
| 9,027,765 B2 | 5/2015 | Battenfeld et al. |
| 9,511,330 B2 | 12/2016 | Yu et al. |
| 2002/0037407 A1 | 3/2002 | Luo et al. |
| 2002/0187701 A1 | 12/2002 | Healey |
| 2003/0054539 A1 | 3/2003 | Schulein et al. |
| 2003/0141261 A1 | 7/2003 | Koslow |
| 2003/0168401 A1 | 9/2003 | Koslow |
| 2003/0177909 A1 | 9/2003 | Koslow |
| 2004/0043243 A1 | 3/2004 | Chen et al. |
| 2004/0178142 A1 | 9/2004 | Koslow |
| 2005/0011827 A1 | 1/2005 | Koslow |
| 2005/0051487 A1 | 3/2005 | Koslow |
| 2005/0070003 A1 | 3/2005 | Schulein et al. |
| 2005/0142973 A1 | 6/2005 | Bletsos et al. |
| 2005/0216075 A1 | 9/2005 | Wang et al. |
| 2006/0102871 A1 | 5/2006 | Wang et al. |
| 2006/0134411 A1 | 6/2006 | Mackey et al. |
| 2006/0249705 A1 | 11/2006 | Wang et al. |
| 2007/0017075 A1 | 1/2007 | Nguyen |
| 2007/0017076 A1 | 1/2007 | Nguyen et al. |
| 2007/0039300 A1 | 2/2007 | Kahlbaugh et al. |
| 2007/0154510 A1 | 7/2007 | Wilcher et al. |
| 2007/0232178 A1 | 10/2007 | Polat et al. |
| 2007/0232179 A1 | 10/2007 | Polat et al. |
| 2007/0251624 A1 | 11/2007 | Han et al. |
| 2007/0266503 A1 | 11/2007 | Schmidt-Forst et al. |
| 2008/0020205 A1 | 1/2008 | Fink et al. |
| 2008/0131471 A1 | 6/2008 | Kolbe et al. |
| 2008/0149561 A1 | 6/2008 | Chu et al. |
| 2008/0154225 A1 | 6/2008 | Phan |
| 2008/0241536 A1 | 10/2008 | Luo et al. |
| 2009/0004473 A1 | 1/2009 | Luo |
| 2009/0022960 A1 | 1/2009 | Suer et al. |
| 2009/0022983 A1 | 1/2009 | Cabell et al. |
| 2009/0025894 A1 | 1/2009 | Barnholtz et al. |
| 2009/0042475 A1 | 2/2009 | Pourdeyhimi |
| 2009/0050578 A1 | 2/2009 | Israel et al. |
| 2009/0078640 A1 | 3/2009 | Chu et al. |
| 2009/0087475 A1 | 4/2009 | Sheehan |
| 2009/0123525 A1 | 5/2009 | Bedard |
| 2009/0165969 A1 | 7/2009 | Luo |
| 2009/0218056 A1 | 9/2009 | Manifold et al. |
| 2009/0218057 A1 | 9/2009 | Manifold et al. |
| 2009/0218058 A1 | 9/2009 | Manifold et al. |
| 2009/0218063 A1 | 9/2009 | Manifold et al. |
| 2009/0220731 A1 | 9/2009 | Manifold et al. |
| 2009/0220741 A1 | 9/2009 | Manifold et al. |
| 2009/0220769 A1 | 9/2009 | Manifold et al. |
| 2009/0227975 A1 | 9/2009 | Dougherty et al. |
| 2009/0232920 A1 | 9/2009 | Lozano et al. |
| 2009/0246447 A1 | 10/2009 | Luo |
| 2009/0269429 A1 | 10/2009 | Lozano et al. |
| 2009/0324926 A1 | 12/2009 | Luo |
| 2010/0044289 A1 | 2/2010 | Koslow |
| 2010/0065236 A1 | 3/2010 | Henriksson et al. |
| 2010/0187171 A1 | 7/2010 | Gupta |
| 2010/0252426 A1 | 10/2010 | Tsukuda et al. |
| 2010/0252510 A1 | 10/2010 | Godsay et al. |
| 2010/0314333 A1 | 12/2010 | Witsch et al. |
| 2010/0319543 A1 | 12/2010 | Witsch et al. |
| 2010/0326902 A1 | 12/2010 | Midkiff et al. |
| 2011/0049041 A1 | 3/2011 | Yonemoto |
| 2011/0114276 A1 | 5/2011 | Cordova et al. |
| 2011/0168622 A1 | 7/2011 | Lucas |
| 2011/0259813 A1 | 10/2011 | Wertz et al. |
| 2012/0085567 A1 | 4/2012 | Lintz et al. |
| 2012/0097032 A1 | 4/2012 | Witsch et al. |
| 2012/0132381 A1 | 5/2012 | Hentze et al. |
| 2012/0152859 A1 | 6/2012 | Battenfeld et al. |
| 2013/0340398 A1 | 12/2013 | Battenfeld et al. |
| 2013/0340613 A1 | 12/2013 | Krupnikov et al. |
| 2013/0341290 A1 | 12/2013 | Yu et al. |
| 2014/0123613 A1 | 5/2014 | Le Port et al. |
| 2014/0166572 A1 | 6/2014 | Snyder |
| 2014/0224727 A1 | 8/2014 | Yu et al. |
| 2015/0107208 A1 | 4/2015 | Battenfeld et al. |

FOREIGN PATENT DOCUMENTS

| | | |
|---|---|---|
| EP | 0 898 316 A1 | 2/1999 |
| EP | 1 493 753 A1 | 1/2005 |
| EP | 0 815 209 B1 | 1/2006 |
| EP | 1 849 896 A1 | 10/2007 |
| WO | WO 96/29397 A1 | 9/1996 |
| WO | WO 97/23669 A1 | 7/1997 |
| WO | WO 98/07911 A1 | 2/1998 |
| WO | WO 99/45875 A1 | 9/1999 |
| WO | WO 00/066820 A1 | 11/2000 |
| WO | WO 01/086043 A1 | 11/2001 |
| WO | WO 03/033806 A2 | 4/2003 |
| WO | WO 03/063996 A2 | 8/2003 |
| WO | WO 03/064006 A1 | 8/2003 |
| WO | WO 04/026958 A1 | 4/2004 |
| WO | WO 2005/001174 A1 | 1/2005 |
| WO | WO 2005/009589 A1 | 2/2005 |
| WO | WO 2005/016208 A1 | 2/2005 |
| WO | WO 2005/017247 A2 | 2/2005 |
| WO | WO 2005/040495 A1 | 5/2005 |
| WO | WO 2005/072950 A1 | 8/2005 |
| WO | WO 2006/007020 A1 | 1/2006 |
| WO | WO 2006/083668 A3 | 8/2006 |
| WO | WO 2006/083796 A2 | 8/2006 |
| WO | WO 2007/089230 A2 | 8/2007 |
| WO | WO 2007/112916 A1 | 10/2007 |
| WO | WO 2007/113772 A1 | 10/2007 |
| WO | WO 2007/120342 A2 | 10/2007 |
| WO | WO 2009/006206 A1 | 1/2009 |
| WO | WO 2009/006207 A1 | 1/2009 |

(56) References Cited

FOREIGN PATENT DOCUMENTS

| WO | WO 2009/059342 A2 | 5/2009 |
|----|-------------------|--------|
| WO | WO 2009/061575 A1 | 5/2009 |
| WO | WO 2009/088635 A2 | 7/2009 |
| WO | WO 2009/107024 A1 | 9/2009 |
| WO | WO 2009/117356 A1 | 9/2009 |
| WO | WO 2009/117361 A1 | 9/2009 |
| WO | WO 2009/117363 A1 | 9/2009 |
| WO | WO 2009/123899 A2 | 10/2009 |
| WO | WO 2010/008621 A1 | 1/2010 |
| WO | WO 2012/124652 A1 | 9/2012 |
| WO | WO 2013/132161 A2 | 9/2013 |

OTHER PUBLICATIONS

International Preliminary Report on Patentability for PCT/US2011/065484 dated Jun. 27, 2013.
International Search Report and Written Opinion for PCT/US2013/046736 dated Nov. 12, 2013.
International Preliminary Report on Patentability for PCT/US2013/046736 dated Dec. 31, 2014.
International Search Report and Written Opinion for PCT/US2013/046752 dated Nov. 5, 2013.
International Preliminary Report on Patentability for PCT/US2013/046752 dated Dec. 31, 2014.
International Search Report and Written Opinion for PCT/US2013/074261 dated Apr. 14, 2014.
International Preliminary Report on Patentability for PCT/US2013/074261 dated Jun. 25, 2015.
Invitation to Pay Additional Fees for PCT/US2014/071547 dated Mar. 12, 2015.
Boldizar et al., Prehydrolyzed cellulose as reinforcing filler for thermoplastics. Int J Polymeric Mat. 1987;4:229-62.
Burger et al., Nanofibrous materials and their applications. Annu. Rev. Mater. Res. 2006;36:333-68.
Chinga-Carrasco et al., Cellulose fibres, nanofibrils and microfibrils: the morphological sequence of MFC components from a plant physiology and fibre technology point of view. Nanoscale Res Lett. 2011;6:417-423.
Garcia De Rodriguez et al., Sisal cellulose whiskers reinforced polyvinyl acetate nanocomposites. Cellulose. 2006;13:261-70.
Henriksson et al., Cellulose nanopaper structures of high toughness. Biomacromolecules. 2008;9:1579-85.
Henriksson et al., Structure and properties of cellulose nanocomposite films containing melamine formaldehyde. J. Appl. Sci. 2007;106:2817-24.
Nakagaito et al., Novel high-strength bicomposites based on microfibrillated cellulose having nano-order unit web-like network structure. Appl. Phys. A. 2005;80:155-9.
Nakagaito et al., The effect of morphological changes from pulp fiber towards nano-scale fibrillated cellulose on the mechanical properties of high-strength plnt fiber based composites. Appl. Phys A. 2004;78:547-52.
Nordqvist et al., Ehancement of the wet properties of transparent chitosan-acetic-acid-salt films using microfibrillated cellulose. Biomacromolec. 2007;8:2398-403.
Ragauskas et al., A nano perspective of cellulose. School of Chemistry and Biochemistry Institute of Paper Science and Technology Georgia Institute of Technology. Feb. 2007. PowerPoint. 24 pages.
Siro et al., Microfibrillated cellulose and new nanocomposite materials: a review. Cellulose. 2010;17:459-94.
Svagan et al., Biomimetic foams of high mechanical performance based on nanostructured cell walls reinforced by native cellulose nanofibrils. Adv. Mater. 2008;20:1263-9.
Svagan et al., Biomimetic polysaccharide nanocomposites of high cellulose content and high toughness. Biomacromolecules. 2007;8:2556-63.
Teague et al., Cellulose nanomaterials—come and get it! Ahead of the Curve. Dec. 12, 2012. http://www.tappi.org/content/enewsletters/ahead/2012/issues/2012-12-12.html?utm_source=Informz&utm_medium=email&utm_campaign=Email.
Zimmermann et al., Cellulose fibrils for polymer reinforcement. Adv. Eng. Mater. 2004;6(9):754-61.
U.S. Appl. No. 14/498,662, filed Sep. 26, 2014, Battenfeld et al.
U.S. Appl. No. 13/528,774, filed Jun. 20, 2012, Yu et al.
U.S. Appl. No. 13/715,357, filed Dec. 14, 2012, Snyder.
U.S. Appl. No. 14/135,187, filed Dec. 19, 2013, Yu et al.
PCT/US2011/065484, Apr. 20, 2012, International Search Report and Written Opinion.
PCT/US2011/065484, Jun. 27, 2013, International Preliminary Report on Patentability.
PCT/US2013/046736, Nov. 12, 2013, International Search Report and Written Opinion.
PCT/US2013/046736, Dec. 31, 2014, International Preliminary Report on Patentability.
PCT/US2013/046752, Nov. 5, 2013, International Search Report and Written Opinion.
PCT/US2013/046752, Dec. 31, 2014, International Preliminary Report on Patentability.
PCT/US2013/074261, Apr. 14, 2014, International Search Report and Written Opinion.
PCT/US2013/074261, Jun. 25, 2015, International Preliminary Report on Patentability.
PCT/US2014/071547, Mar. 12, 2015, Invitation to Pay Additional Fees.

FILTER MEDIA WITH FIBRILLATED FIBERS

RELATED APPLICATIONS

This application is a continuation of U.S. application Ser. No. 12/971,432, filed Dec. 17, 2010, which is incorporated herein by reference in its entirety.

FIELD OF INVENTION

Aspects described herein relate generally to filter media and more particularly to filter media including glass fibers and fibrillated fibers.

BACKGROUND

Filter media can be used to remove contamination in a variety of applications. Depending on the application, the filter media may be designed to have different performance characteristics. For example, a filter media may be designed to have performance characteristics suitable for hydraulic applications which involve filtering contamination in pressurized fluids (e.g., liquid). Filter media may also be designed to have performance characteristics suitable for applications that involve filtering in air.

In general, filter media can be formed of a web of fibers. The fiber web provides a porous structure that permits fluid (e.g., hydraulic fluid, air) to flow through the filter media. Contaminant particles contained within the fluid may be trapped on the fibrous web. Filter media characteristics, such as fiber diameter and basis weight, affect filter performance including filter efficiency, dust holding capacity and resistance to fluid flow through the filter.

Certain filter media include webs formed of glass fibers. Such media can exhibit brittle characteristics, which generally make the filter media sensitive to handle and difficult to pleat. In some filter media, synthetic components (e.g., polyvinyl alcohol) are added to the web to improve mechanical properties such as strength. However, such components can negatively effect filtration properties including lowering dust holding capacity and causing instabilities in efficiency over time.

In general, there is a need for a glass fiber filter media which has a desirable balance of properties including high flexibility and strength, high dust holding capacity and a stable efficiency over the life time of the filter media.

SUMMARY

Filter media suitable for various applications, and related components, systems, and methods associated therewith are provided.

In one aspect, a filter media is provided. The filter media includes a fiber web having glass fibers and lyocell fibers. The fiber web has a basis weight of between about 10 and about 1000 g/m² and a thickness of between about 0.10 mm and about 50.0 mm. The average Canadian Standard Freeness level of fibrillation of the lyocell fibers in the fiber web is between 45 and 850.

In another aspect, a filter media including a fiber web having glass fibers and fibrillated fibers is provided. The fiber web has a beta efficiency ratio of greater than about 100 for particles having an average diameter of greater than about 1 micron and the fiber web has a dust holding capacity of greater than about 50 g/m².

In a further aspect, a filter media including a fiber web having glass fibers and non-fibrillated synthetic fibers is provided. The fiber web has a beta efficiency ratio of greater than about 100 for particles having an average diameter of greater than about 1 micron and the beta efficiency ratio increases or remains constant over greater than 60% of an entire test period in which the fiber web is subject to the multipass filter test. The fiber web has a dust holding capacity of greater than about 50 g/m², and the fiber web exhibits a tensile elongation in a cross-machine direction of greater than about 1%. The non-fibrillated synthetic fibers comprise less than about 30% by weight of the fiber web.

In yet another aspect, a filter media including a fiber web having a plurality of glass fibers and a plurality of fibrillated fibers is provided. The filter media has a tensile elongation in a cross-machine direction of greater than about 1%.

In a different aspect, a method of filtering a fluid is provided. The method includes flowing a fluid through a fiber web having glass fibers and lyocell fibers. The average Canadian Standard Freeness level of fibrillation of the lyocell fibers is between 45 and 850.

Other aspects, embodiments, advantages and features of the invention will become apparent from the following detailed description.

BRIEF DESCRIPTION OF THE DRAWINGS

The accompanying drawings are not intended to be drawn to scale. For purposes of clarity, not every component may be labeled in every drawing. In the drawings.

DETAILED DESCRIPTION

Figure 1:
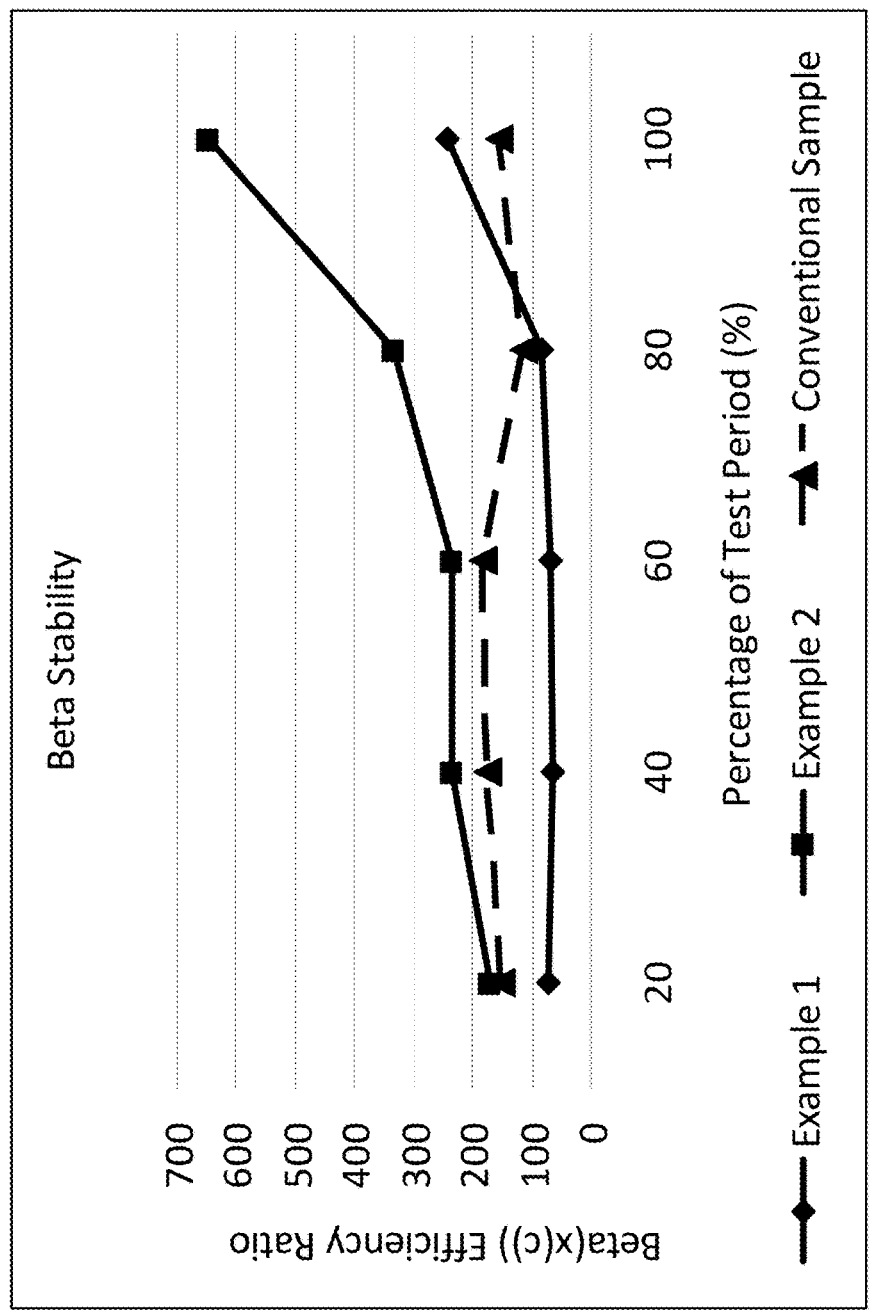
FIG. 1 depicts a graph of Beta Efficiency over time for Examples 1 and 2 and a conventional glass fiber filter media.

Filter media suitable for various applications (e.g., hydraulic) and related components, systems, and methods associated therewith are described. The filter media may include a fiber web having a mixture of glass fibers and fibers that are fibrillated. The fibrillated fibers, for example, may be formed of lyocell. As described further below, the presence of fibrillated fibers may enhance mechanical properties of the fiber web, such as flexibility and strength, as well as improve filtration properties such as dust holding capacity and efficiency stability over time, amongst other benefits. The filter media may be particularly well-suited for applications that involve filtering liquids (e.g., hydraulic fluid) but also can be used in other applications.

The filter media described herein include fibrillated fibers (e.g., lyocell fibers). As known to those of ordinary skill in the art, a fibrillated fiber includes a parent fiber that branches into smaller diameter fibrils which can, in some instances, branch further out into even smaller diameter fibrils with further branching also being possible. The branched nature of the fibrils lead to a high fiber surface area and can increase the number of contact points between the fibrillated fibers and the glass fibers in the web. It is believed that this increase in points of contact between the fibrillated fibers and the glass fibers contributes to enhancing the mechanical properties (e.g., flexibility, strength) of the web.

In general, the fibrillated fibers may include any suitable level of fibrillation. The level of fibrillation relates to the extent of branching in the fiber. The level of fibrillation may be measured according to several suitable methods.

For example, the level of fibrillation can be measured according to a Canadian Standard Freeness (CSF) test, specified by TAPPI test method T 227 om 09 Freeness of pulp. In some embodiments, the average CSF value for the fibrillated fibers may be greater than about 100. For example, the average CSF value may be between 45 and 850, between about 100 and about 600, between about 100 and 500; between about 100 and 400, and between about 100 and 300. In some embodiments, the average CSF value of the fibrillated fibers may be greater than about 200. For example, the average CSF value may be between about 200 and 600, between about 200 and about 500, between about 200 and about 400, and between about 200 and 300. In some embodiments, the average CSF values of the fibrillated fibers may be greater than about 300. For example, the average CSF values may be between about 300 and about 600, between about 300 and 500, and between about 300 and about 400.

In some embodiments, the level of fibrillation can be measured according to a Schopper Riegler (SR) test. In some embodiments, the average SR value for the fibrillated fibers may be greater than about 20. For example, the average SR value may be between about 20 and about 70, between about 20 and about 60, and between about 20 and about 50. In some embodiments, the average SR value may be greater than about 30. For example, the average SR value may be between about 30 and about 70, and between about 30 and about 50. In some embodiments, the average SR value may be greater than about 40, for example, the average SR value may be between about 40 and about 50.

In some embodiments, the level of fibrillation can be measured according to a Williams Freeness (WF) test. In some embodiments, the average WF value for the fibrillated fibers may be greater than about 150. For example, the average WR values for the fibrillated fibers may be between about 150 and about 700, and between about 150 and 500. In some embodiments, the WF values may be greater than about 250. For example, the WR values may be between about 250 and about 700, and between about 250 and 500.

It should be understood that, in certain embodiments, the fibers may have fibrillation levels outside the above-noted ranges.

In certain preferred embodiments, the fibrillated fibers are formed of lyocell. Lyocell fibers are regenerated cellulose fibers that generally may be processed to have high levels of fibrillation. Lyocell fibers may be resistant to high temperature, further providing the filter media with an increased resistance to high temperatures. Suitable lyocell fibers may be obtained, for example, in an un-fibrillated or fibrillated state. Fibrillated fibers may be formed from materials other than lyocell including rayon or other cellulose based materials. In some cases, rayon fibers may be manufactured through a spinning process in a water-based environment. Lyocell fibers may be manufactured, in some embodiments, through spinning in a non-water-based environment (e.g., amine oxide), which may increase the potential level of fibrillation when processed, for example, in comparison to rayon. Fibers may be fibrillated through any appropriate fibrillation refinement process. In some embodiments, fibers (e.g., lyocell fibers) are fibrillated using a disc refiner, a stock beater or any other suitable fibrillating equipment.

It should be understood that, in certain embodiments, the fibrillated fibers may have other compositions than those described above.

In general, the fibrillated fibers may have any suitable dimensions. As noted above, fibrillated fibers include parent fibers and fibrils. The parent fibers may have an average diameter of less than about 75 microns; in some embodiments, less than about 60 microns; and in some embodiments, less than about 15 microns. The fibrils may have an average diameter of less than about 15 microns; in some embodiments, less than about 10 microns; in some embodiments, less than about 6 microns; in some embodiments, less than about 4 microns; in some embodiments, less than about 3 microns; and in some embodiments, less than about 1 micron. For example, the fibrils may have a diameter of between about 3 microns and about 10 microns, or between about 3 microns and about 6 microns. The fibrillated fibers described may have an average length of less than about 15 mm. For example, the average length may be between about 0.2 and about 12 mm, or between about 2 mm and about 4 mm. The above-noted dimensions may be, for example, when the fibrillated fibers are lyocell.

It should be understood that, in certain embodiments, the fibers and fibrils may have dimensions outside the above-noted ranges.

In general, the fiber web may include any suitable weight percentage of fibrillated fibers to achieve the desired balance of properties. In some embodiments, the fibrillated fibers make up greater than about 2.5% by weight of the fiber web; in some embodiments, the fibrillated fibers make up greater than about 5.0% by weight of the fiber web; in some embodiments, greater than about 10% by weight of the fiber web; and, in some embodiments, greater than about 15% by weight of the fiber web. For example, the fiber web may comprise between about 2.5% and about 60% by weight of fibrillated fibers; in some embodiments, between about 5.0% and about 30% by weight fibrillated fibers; and, in some embodiments, between about 15% by weight and about 25% by weight of fibrillated fibers.

In some cases, it may be advantageous for the fibrillated fibers to be aligned in the machine direction of the web (i.e., when a fiber's length extends substantially in the machine direction) and/or in the cross-machine direction of the web (i.e., when a fiber's length extends substantially in the cross-machine direction). It should be understood that the terms machine direction and cross-machine direction have their usual meanings in the art. That is, the machine direction refers to the direction in which the fiber web moves along the machine during processing and a cross-machine direction is perpendicular to the machine direction. For example, between about 30% and about 70% by weight of the fibrillated fibers, between about 40% and about 60% by weight of the fibrillated fibers, or between about 45% and about 50% by weight of the fibrillated fibers may be substantially aligned in the machine direction. Similarly, between about 30% and about 70% by weight of the fibrillated fibers, between about 40% and about 60% by weight of the fibrillated fibers, or between about 45% and about 50% by weight of the fibrillated fibers may be substantially aligned in the cross-machine direction.

In addition to the fibrillated fibers, the fiber webs can include glass fibers. The glass fibers may be the largest fiber component in the web by weight. For example, the fiber web may comprise greater than about 50% by weight of glass fibers; in some embodiments, greater than about 60% by weight; in some embodiments, greater than about 70% by weight; and, in some embodiments, greater than about 80% by weight.

The glass fibers of a fiber web may have any suitable average fiber diameter and may depend on the type of glass fiber used. In some embodiments, the glass fibers have an average fiber diameter of at least 5.0 microns, at least 10.0 microns, or at least 15.0 microns. The average fiber diameter may be up to about 30.0 microns in some cases. In certain embodiments, the glass fibers have an average fiber diameter between about 0.1 microns and about 30.0 microns (e.g., between about 1.0 micron and about 20.0 microns, between about 5.0 microns and 15.0 microns, or between about 6.0 microns and 12.0 microns). In some instances, the glass fibers can have small average diameters such as less than about 10.0 microns. For example, the average diameter may be between about 0.01 microns to about 10.0 microns; in some embodiments, between about 0.4 microns and about 8.0 microns; and in certain embodiments, between about 0.3 microns and about 6.5 microns (e.g., between 1.0 microns and 5.0 microns, between about 0.4 microns and 4.0 microns, between about 0.3 microns and about 3.0 microns, or between about 0.2 microns and 2.0 microns). Other diameters and ranges are also possible. Average diameters of the glass fibers may have any suitable distribution. In some embodiments, the diameters of the fibers are substantially the same. In other embodiments, average diameter distribution for glass fibers may be log-normal.

However, it can be appreciated that glass fibers may be provided in any other appropriate average diameter distribution (e.g., a Gaussian distribution, a bimodal distribution).

The glass fibers may vary significantly in length as a result of process variations. For instance, glass fibers may have a length in the range of between about 0.125 inches and about 1 inch (e.g., about 0.25 inches, or about 0.5 inches). The aspect ratios (length to diameter ratio) of the glass fibers may be generally in the range of about 100 to about 10,000. In some embodiments, the aspect ratio of the glass fibers may be in the range of about 200 to about 2500; or, in the range of about 300 to about 600. In some embodiments, the average aspect ratio of the glass fibers may be about 1,000; or about 300.

It should be appreciated that the above-noted dimensions are not limiting and that the glass fibers may also have other dimensions.

Average lengths of the glass fibers may have any suitable distribution. In some embodiments, the lengths of the fibers are substantially the same. In other embodiments, average length distribution for glass fibers may be log-normal. However, it can be appreciated that glass fibers may be provided in any other appropriate average length distribution (e.g., a Gaussian distribution, a bimodal distribution).

Examples of glass fibers that may have the above-mentioned properties include chopped strand glass fibers and microglass fibers. In some embodiments, the fiber web has a combination of chopped strand glass fibers and microglass fibers. Chopped strand glass fibers and microglass fibers are known to those skilled in the art. One skilled in the art is able to determine whether a glass fiber is chopped strand or microglass by observation (e.g., optical microscopy, electron microscopy). Chopped strand glass may also have chemical differences from microglass fibers. In some cases, though not required, chopped strand glass fibers may contain a greater content of calcium or sodium than microglass fibers. For example, chopped strand glass fibers may be close to alkali free with high calcium oxide and alumina content. Microglass fibers may contain 10-15% alkali (e.g., sodium, magnesium oxides) and have relatively lower melting and processing temperatures. The terms refer to the technique(s) used to manufacture the glass fibers. Such techniques impart the glass fibers with certain characteristics. In general, chopped strand glass fibers are drawn from bushing tips and cut into fibers. Microglass fibers are drawn from bushing tips and further subjected to flame blowing or rotary spinning processes. In some cases, fine microglass fibers may be made using a remelting process. In this respect, microglass fibers may be fine or coarse. Chopped strand glass fibers are produced in a more controlled manner than microglass fibers, and as a result, chopped strand glass fibers will generally have less variation in fiber diameter and length than microglass fibers.

In some embodiments, the microglass fibers can have small diameters such as less than about 10.0 microns, less than about 5 microns, less than about 3 microns, less than about 1 micron, or less than about 0.5 microns. For example, the diameter may be between about 0.01 microns to about 10.0 microns; between about 0.1 microns and about 10.0 microns; in some embodiments, between about 1.0 micron and about 10.0 microns; in some embodiments, between about 1.0 micron and about 5.0 microns; in some embodiments, between about 5.0 microns and about 10.0 microns; in some embodiments, between about 0.1 microns and about 9.0 microns; in some embodiments, between about 0.3 microns and about 6.5 microns; in some embodiments, between about 0.4 microns and about 8.0 microns; in some embodiments, between about 0.4 microns and about 4.0 microns; and in some embodiments, between about 0.3 microns and about 3.0 microns, or between about 0.2 microns and 2.0 microns. In some embodiments, average diameter distributions for microglass fibers may be log-normal. However, it can be appreciated that microglass fibers may be provided in any other appropriate average diameter distribution (e.g., a Gaussian distribution, a bimodal distribution).

As noted above, microglass fibers may be fine or coarse. As used herein, fine microglass fibers are less than about 1 micron in diameter and coarse microglass fibers are greater than or equal to about 1 micron in diameter.

The microglass fibers may vary significantly in length as a result of process variations. The aspect ratios (length to diameter ratio) of the microglass fibers may be generally in the range of about 100 to about 10,000. In some embodiments, the aspect ratio of the microglass fibers may be in the range of about 200 to about 2500; or, in the range of about 300 to about 600. In some embodiments, the average aspect ratio of the microglass fibers may be about 1,000; or about 300. It should be appreciated that the above-noted dimensions are not limiting and that the microglass fibers may also have other dimensions. In some embodiments, average length distributions for microglass fibers may be log-normal. Though, in other embodiments, microglass fibers may be provided in any appropriate average length distribution (e.g., a Gaussian distribution, a bimodal distribution).

The chopped strand glass fibers may have an average fiber diameter that is greater than the diameter of the microglass fibers. In some embodiments, the chopped strand glass fiber has a diameter of greater than about 5 microns, greater than about 10.0 microns, or greater than about 15.0 microns. For example, the diameter range may be up to about 30 microns. In some embodiments, the chopped strand glass fibers may have a fiber diameter between about 1.0 micron and about 30.0 microns, between about 1.0 micron and about 20.0 microns, between 1.0 micron and 10.0 microns, between about 1.0 micron and 5.0 microns, between about 3.0 microns and 8.0 microns, between about 4.0 microns and 7.0 microns, between about 5.0 microns and 15.0 microns, between about 5 microns and about 12 microns. In one embodiment, the chopped strand glass fibers may have an average fiber diameter of about 6.5 microns. In some embodiments, the diameters of the chopped strand glass fibers are substantially the same.

In some embodiments, chopped strand glass fibers may have a length in the range of between about 0.125 inches and about 1 inch (e.g., about 0.25 inches, or about 0.5 inches). In some embodiments, the lengths of the chopped strand glass fibers are substantially the same.

It should be appreciated that the above-noted dimensions are not limiting and that the microglass and chopped strand fibers may also have other dimensions.

In some embodiments, the chopped strand glass fibers may have an organic surface finish. Such a surface finish can, for example, enhance dispersion of the fibers during processing. In various embodiments, the surface finish may include starch, polyvinyl alcohol, or other suitable finishes. In some cases, the surface finish may be applied as a coating as the chopped strand glass fibers are extruded during production.

Any suitable amount of microglass fibers may be used. In certain embodiments, the ratio between the weight percentage of microglass fibers and chopped strand glass fibers provides for different characteristics. In some embodiments, the fiber web may include a relatively large percentage of microglass fibers compared to chopped strand glass fibers. For example, the fiber web may include microglass in an amount greater than 40% by weight of the fiber web; in some embodiments, greater than 50% by weight of the fiber web; in some embodiments, greater than 60% by weigh of the fiber web; and, in some embodiments, greater than 70% by weight of the fiber web, greater than 90 wt % of the fiber web, or greater than 95 wt % of the fiber web. In certain embodiments, the fiber web includes ranges of microglass fibers outside of the above-noted ranges.

In general, any suitable amount of chopped strand fibers can be used. In some embodiments, the fiber web may include a relatively low percentage of chopped strand fibers. For example, in some embodiments, the fiber web includes between about 1% by weight and about 30% by weight chopped strand fibers; in some embodiments, between about 5% by weight and about 30% by weight; and, in some embodiments, between about 10% by weight and about 20% by weight. In some cases, the fiber web might not include any chopped strand fibers. It should be understood that, in certain embodiments, the fiber web does not include chopped strand fibers within the above-noted ranges.

In addition to glass fibers and fibrillated fibers, the fiber web may include other components such as certain types of synthetic (e.g., thermoplastic) fibers (other than lyocell fibers) and/or binder material. Examples of suitable synthetic fibers include polyester, polyethylene, polypropylene, polyolefin, nylon, and combinations thereof. It should be appreciated that other appropriate synthetic fibers may also be used.

In some embodiments, the fiber web may include a relatively low percentage of synthetic fibers other than lyocell fibers. For example, the fiber web may include less than 30%, less than 20%, less than 10%, less than 5%, or less than 1% by weight of synthetic fibers other than lyocell fibers. In some cases, synthetic fibers other than lyocell fibers make up between about 1% and about 30%, between about 1% and about 10%, or between about 1% and about 5% by weight of the fiber web. In some cases, the fiber web does not include any synthetic fiber other than lyocell fiber and, thus, is free of synthetic fiber other than lyocell fiber. It should be understood that it may also be possible for synthetic fibers to be incorporated within the fiber web outside of the ranges disclosed.

A binder material may be incorporated in the fiber web, typically comprising a small weight percentage of the fiber web. In general, a binder may have any suitable composition. In some embodiments, the binder is resin-based. The binder may comprise acrylic, PVA, a thermoplastic, a thermoset, or a combination thereof. In some embodiments, the binder may be added to the web in fiber form. The binder may comprise one or more components, for example, the binder may be in the form of bicomponent fibers such as with components having different melting temperatures. In some cases, the binder may comprise less than about 10%, or less than about 5% (e.g., between 2% and 5%) by weight of the fiber web. For example, the binder may comprise between about 1% and about 9%, or between about 5% and about 9% by weight of the fiber web. As described further below, the binder may be added to the fibers in any suitable manner in the wet fiber web state. In some embodiments, the binder coats the fibers and is used to adhere fibers to each other to facilitate adhesion between the fibers.

In addition to binder material, glass components, lyocell and synthetic components described above, the fiber web may include a variety of other suitable additives (typically, in small weight percentages of the fiber web) such as, surfactants, coupling agents, crosslinking agents, conductive additives, amongst others. Though, it should be understood that not all embodiments include all of these components and that other appropriate additives may be suitably incorporated.

The fiber webs (and resulting filter media) may have a variety of desirable properties and characteristics. For example, the fiber webs described herein can be designed to have varying basis weight, pore size, thickness, porosity, surface area, permeability, dust holding capacity, efficiency and/or pressure drop, depending upon the requirements of a desired application.

The overall basis weight of the fiber web can vary depending on factors such as the strength requirements of a given filtering application, the materials used to form the filter media, as well as the desired level of filter efficiency and permissible levels of resistance or pressure drop. In certain embodiments described herein, some fiber webs may have a low overall basis weight while achieving advantageous filtration performance or mechanical characteristics. For example, a fiber web incorporating fibrillated fibers which provides for an enhanced surface area of the fiber web may have a low basis weight without a sacrifice in strength. In some embodiments, the overall basis weight of the fiber web may range from between about 5 and about 1000 g/m$^2$, between about 10 and about 1000 g/m$^2$, between about 15 and about 500 g/m$^2$, between about 15 and about 150 g/m$^2$, between about 30 and about 150 g/m$^2$, between about 90 g/m$^2$ and about 150 g/m$^2$, or between about 30 g/m$^2$ and about 100 g/m$^2$. As determined herein, the basis weight of the fiber web is measured according to the ISO 536 Standard. Values are expressed in grams per square meter or pounds per 3,000 square feet. Basis weight can generally be measured on a laboratory balance that is accurate to 0.1 grams.

Thickness, as referred to herein, is determined according to ISO 534 tested at 2 N/cm$^2$. The overall thickness of the fiber web may be between about 0.05 mm and about 100.0 mm, between about 0.10 mm and about 50.0 mm, between about 0.10 mm and about 10.0 mm, between about 0.15 mm and about 1.0 mm, between about 0.20 mm and about 0.90 mm, between about 0.2 mm and about 0.8 mm, or between about 0.25 mm and about 0.50 mm.

The fiber web may exhibit a suitable mean flow pore size. Mean flow pore size, as determined herein, is measured according to ASTM E1294. In some embodiments, the mean flow pore size may range between about 2.5 microns and about 5.0 microns, or between about 5 microns and about 20 microns.

In some embodiments, it may be preferable for the fiber web to exhibit certain mechanical characteristics. For example, as discussed, blending glass fibers and fibrillated fibers together in a fiber web may give rise to a flexible filter media that is less prone to damage from pleating as compared with conventional glass fiber filter media.

The fiber web may have different tensile elongation properties in the machine direction and the cross-machine direction. For example, the tensile elongation in the machine direction of the fiber web may be greater than about 0.2%, greater than about 0.5%, or greater than about 0.8%. For example, the tensile elongation in the machine direction of the fiber web may be between about 0.2% and about 4.0%, between about 0.5% and about 3.5%, between about 1.0% and about 3.0%, or between about 1.5% and about 2.5%. The tensile elongation in the cross-machine direction of the fiber web may be greater than about 0.2%, greater than about 0.5%, greater than about 0.8%, or greater than about 1.0%. For example, the tensile elongation in the cross-machine direction of the fiber web may be between about 0.2% and about 6.0%, between about 0.2% and about 5.0%, between about 0.5% and about 4.5%, between about 1.0% and about 3.5%, or between about 2.0% and about 3.5%.

The tensile strength properties may also vary for the fiber web in the machine direction and the cross-machine direction. The tensile strength in the machine direction of the filter media may be greater than 2 N/15 mm, or greater than 4 N/15 mm. For example, the tensile strength in the machine direction of the fiber web may be between about 1 N/15 mm and about 6 N/15 mm, between about 2 N/15 mm and about 5 N/15 mm, or between about 3 N/15 mm and about 4 N/15 mm. The tensile strength of the fiber web in the cross-machine direction may be greater than 1 N/15 mm, or greater than 3 N/15 mm and may also be between about 1 N/15 mm and about 6 N/15 mm, between about 2 N/15 mm and about 5 N/15 mm, or between about 3 N/15 mm and about 4 N/15 mm. In some cases, the cross machine direction tensile strength may be greater or less than the machine direction tensile strength.

Tensile strength and tensile elongation are measured according to the following Standard EN/ISO 1924-2.

Dry Schopper burst tests may be used as a further test for strength in measuring the pressure required for puncturing the fiber web as an indicator of the load carrying capacity of the fiber web under certain conditions. Dry Schopper burst strength is measured according to DIN 53113. In some embodiments, the dry Schopper burst for the fiber web may be greater than 15 kPa, greater than 30 kPa, greater than 40 kPa, or between about 5 kPa and about 50 kPa, between about 10 kPa and about 40 kPa, between about 15 kPa and about 30 kPa, or between about 15 kPa and about 20 kPa.

It should be understood that the dry Schopper burst strength may depend on the basis weight. For example, the dry Schopper burst may increase with increasing basis weight.

The fiber web described herein may also exhibit advantageous filtration performance characteristics, such as dust holding capacity (DHC), beta efficiency, stability of the efficiency, air resistance, air permeability, retention, amongst others.

The fiber webs described herein can have beneficial dust holding properties. In some embodiments, the fiber web may have a DHC of greater than 50 $g/m^2$, greater than 60 $g/m^2$, greater than 80 $g/m^2$, greater than 100 $g/m^2$, greater than 150 $g/m^2$, greater than 200 $g/m^2$, greater than 230 $g/m^2$, or greater than 250 $g/m^2$. In some cases, the fiber web can have an overall DHC of between about 30 $g/m^2$ and about 250 $g/m^2$, between about 50 $g/m^2$ and about 230 $g/m^2$, between about 70 $g/m^2$ and about 200 $g/m^2$, between about 90 $g/m^2$ and about 150 $g/m^2$, between about 100 $g/m^2$ and about 130 $g/m^2$, or between about 110 $g/m^2$ and about 120 $g/m^2$. The dust holding capacity, as referred to herein, is tested based on a Multipass Filter Test following the ISO 16889 procedure (modified by testing a flat sheet sample) on a Multipass Filter Test Stand manufactured by Graphischer Maschinenbau Nordhausen GmbH (GMN). The testing uses ISO A3 Medium test dust manufactured by PTI, Inc. at an upstream gravimetric dust level of 10 mg/liter. The test fluid is Aviation Hydraulic Fluid AERO HFA MIL H-5606A manufactured by Mobil. The test is run at a face velocity of 0.25 meters/min until a terminal pressure of 2 bars above the baseline filter pressure drop is obtained.

The fiber webs described herein may be used for the filtration of various particle sizes, e.g., particles having a size of less than or equal to about 50 microns, less than or equal to about 30 microns, less than or equal to about 20 microns, less than or equal to about 15 microns, less than or equal to about 10 microns, less than or equal to about 5 microns, less than or equal to about 3 microns, or less than or equal to about 1 micron. The efficiency of filtering such particle sizes can be measured using a Multipass Filter Test. For instance, the efficiency values are determined following the ISO 16889 procedure (modified by testing a flat sheet sample) on a Multipass Filter Test Stand manufactured by GMN. The testing uses ISO A3 Medium test dust manufactured by PTI, Inc. at an upstream gravimetric dust level of 10 mg/liter. The test fluid is Aviation Hydraulic Fluid AERO HFA MIL H-5606A manufactured by Mobil. The test is run at a face velocity of 0.25 meters/min until a terminal pressure of 2 bars above the baseline filter pressure drop is obtained. Particle counts (particles per milliliter) at the minimum particle sizes selected (e.g., 3, 4, 5, 7, 10, 15, 20, 25, 30, 40 or 50 microns) upstream and downstream of the media can be taken at ten points equally divided over the time of the test. The average of upstream and downstream particle counts can be taken at each selected minimum particle size and particles greater than that size. From the average particle count upstream (injected, $C_0$) and the average particle count downstream (passed thru, C) the liquid filtration efficiency test value for each minimum particle size selected can be determined by the relationship $[1-[C/C_0]]*100\%]$.

Efficiency can also be expressed in terms of a Beta efficiency ratio, where $Beta_{(x)}=y$ is the ratio of upstream count ($C_0$) to downstream count (C), and where x is the minimum particle size that will achieve the actual ratio of $C_0$ to C that is equal to y. The penetration fraction of the media is 1 divided by the $Beta_{(x)}$ value (y), and the efficiency fraction is 1−penetration fraction. Accordingly, the efficiency of the media is 100 times the efficiency fraction, and $100*(1-1/Beta_{(x)})$=efficiency percentage. For example, the fiber web having a $Beta_{(x)}=200$ has an efficiency of $[1-(1/200)]*100$, or 99.5% for x micron or greater particles. The fiber web described herein may have a wide range of Beta ratios, e.g., a $Beta_{(x)}=y$, where x can be, for example, between 1 and 100 microns, between about 1 micron and about 50 microns, between about 4 microns and about 25 microns, greater than about 1 micron, greater than about 3 microns, greater than about 4 microns, or greater than about 10 microns; and where y can be, for example, between 2 and 1000, greater than about 50, greater than about 100, greater than about 200, greater than about 300, greater than about 500, or greater than about 800. It should be understood that other values of x and y are also possible; for instance, in some cases, y may be greater than 1000. It should also be understood that for any value of x, y may be any number representing the actual ratio of $C_0$ to C. Likewise, for any value of y, x may be any number representing the minimum particle size that will achieve the actual ratio of $C_0$ to C that is equal to y. In some embodiments, a particle size (e.g., particle diameter) where $Beta_{(x)}=200$ (i.e., a beta efficiency of 200) for the fiber web may range between about 1 micron and about 50 microns, or between about 4 microns and about 25 microns. Or, put another way, the fiber web may have a beta efficiency of about 200 for particles having an average diameter of between about 1 micron and about 50 microns, or between about 4 microns and about 25 microns.

The stability of the beta efficiency ratio over time may also be measured. In some embodiments, the beta efficiency ratio may increase or remain constant over an entire time period in which the fiber web is subject to the multipass filter test described above. In some embodiments, a beta efficiency ratio may increase or remain constant over greater than 60% of the entire test period in which the fiber web is subject to the multipass filter test described above. For example, the beta efficiency ratio of the fiber web may increase or remain constant over greater than 70%, greater than 80% or greater than 90% of the entire test period in which the fiber web is subject to the multipass filter test. A conventional glass fiber web without the fibrillated fibers described herein may fail (or exhibit a substantial decrease in efficiency) prior to a glass fiber web that includes fibrillated fibers. Thus, when subject to a multipass filter test, a conventional flat sheet glass fiber web without the fibrillated fibers described herein is observed to exhibit a substantial decrease in the measured beta efficiency ratio of the filter media prior to completion of the multipass filter test at an earlier time than compared to a flat sheet glass fiber web with fibrillated fibers.

Accordingly, pleated glass fiber web including the fibrillated fibers exhibits a greater stability of efficiency than a conventional pleated glass fiber web without the fibrillated fibers. For example, a conventional pleated glass fiber web without fibrillated fibers, after a certain period of time, may fail at the pleated edges of the filter media, permitting contaminants to flow undesirably through the fiber web. In contrast, a pleated glass filter media with the fibrillated fibers may exhibit a beta efficiency ratio that increases or remains constant for a greater period of time during a multipass filter test as compared to a conventional pleated glass filter media without fibrillated fibers.

The fiber webs may exhibit suitable air permeability characteristics. In some embodiments, the overall permeability may range from between about 2 cubic feet per minute per square foot (cfm/sf) and about 250 cfm/sf, between about 2.3 cfm/sf and about 213 cfm/sf, or between about 6 cfm/sf and about 150 cfm/sf. As determined herein, the permeability is measured according to EN ISO 9237. The permeability is an inverse function of flow resistance and can be measured with a Frazier Permeability Tester. The Frazier Permeability Tester measures the volume of air per unit of time that passes through a unit area of sample at a fixed differential pressure across the sample. Permeability can be expressed in cubic feet per minute per square foot at a 0.5 inch water differential.

The air resistance of the fiber web was measured using a 10 $cm^2$ test area at a 40 cm/s face velocity. In some embodiments, the air resistance of the fiber web may range from between about 0.5 mbar and about 50 mbar, or between about 1.5 mbar and about 10 mbar.

The fiber webs may have suitable efficiency characteristics in air. Efficiency in air is measured using an air filter test according to EN1822/1 where the fiber web is subject to particles having a suitable size and traveling at a suitable face velocity. For example, the air filter test may use particles 0.1 microns in size, or 0.3 micron particles in size against the fiber web. In some embodiments, the air filter test may force the particles to travel at a 1.7 cm/sec face velocity, a 2.5 cm/sec face velocity, or a 5.3 cm/sec face velocity against the fiber web. It can be appreciated that the efficiency in air may be measured according to subjecting a fiber web to other suitable particle sizes and face velocities. In some embodiments, efficiency in air as measured by the air filter test may be greater than about 10%, greater than about 20%, or greater than about 30%, greater than about 50%, greater than about 70%, greater than about 90%, greater than about 95%, greater than about 99.0%, greater than about 99.9%, or greater than about 99.99%.

In general, the fiber webs may be produced using suitable processes, such as using a wet laid or a dry laid process. In general, a wet laid process involves mixing together of the fibers; for example, glass fibers (e.g., chopped strand and/or microglass) may be mixed together with the fibrillated fibers (e.g., lyocell), or optionally any other synthetic fibers, to provide a fiber slurry. In some cases, the slurry is an aqueous-based slurry. In certain embodiments, the microglass fibers, fibrillated fibers, and optionally any chopped strand and/or other synthetic fibers, are stored separately in various holding tanks prior to being mixed together. These fibers may be processed through a pulper before being mixed together. In some embodiments, combinations of chopped strand glass fibers, microglass fibers, fibrillated fibers, and/or other synthetic fibers are processed through a pulper and/or a holding tank prior to being mixed together. As discussed above, microglass fibers may include fine microglass fibers and coarse microglass fibers.

It should be appreciated that any suitable method for creating a glass fiber slurry may be used. In some cases, additional additives are added to the slurry to facilitate processing. The temperature may also be adjusted to a suitable range, for example, between 33° F. and 100° F. (e.g., between 50° F. and 85° F.). In some embodiments, the temperature of the slurry is maintained. In some cases, the temperature is not actively adjusted.

In some embodiments, the wet laid process uses similar equipment as a conventional papermaking process, which includes a hydropulper, a former or a headbox, a dryer, and an optional converter. For example, the slurry may be prepared in one or more pulpers. After appropriately mixing the slurry in a pulper, the slurry may be pumped into a headbox, where the slurry may or may not be combined with other slurries or additives may or may not be added. The slurry may also be diluted with additional water such that the final concentration of fiber is in a suitable range, such as for example, between about 0.1% to 0.5% by weight.

In some cases, the pH of the glass fiber slurry may be adjusted as desired. For instance, the pH of the glass fiber slurry may range between about 1.5 and about 7.0, between about 2.5 and about 4.0, or between about 2.6 and about 3.2.

Before the slurry is sent to a headbox, the slurry may be passed through centrifugal cleaners and/or pressure screens for removing unfiberized glass or shot. The slurry may or may not be passed through additional equipment such as refiners or deflakers to further enhance the dispersion or fibrillation of the fibers. Fibers may then be collected on a screen or wire at an appropriate rate using any suitable machine, e.g., a fourdrinier, a rotoformer, a cylinder, or an inclined wire fourdrinier.

In some embodiments, the process involves introducing binder (and/or other components) into a pre-formed glass fiber layer (e.g., including lyocell in the glass fiber layer). In some embodiments, as the glass fiber layer is passed along an appropriate screen or wire, different components included in the binder, which may be in the form of separate emulsions, are added to the glass fiber layer using a suitable technique. In some cases, each component of the binder resin is mixed as an emulsion prior to being combined with the other components and/or glass fiber layer. In some embodiments, the components included in the binder may be pulled through the glass fiber layer using, for example, gravity and/or vacuum. In some embodiments, one or more of the components included in the binder resin may be diluted with softened water and pumped into the glass fiber layer. In some embodiments, a binder may be introduced to the glass fiber layer by spraying onto the formed media, or by any other suitable method, such as for example, size press application, foam saturation, curtain coating, rod coating, amongst others. In some embodiments, a binder material may be applied to a fiber slurry prior to introducing the slurry into a headbox. For example, the binder material may be injected into the fiber slurry and precipitated on to the fibers.

In other embodiments, a dry laid process is used. In a dry laid process, glass fibers are chopped and dispersed along with fibrillated fibers (e.g., lyocell) in air that is blown onto a conveyor, and a binder is then applied. Dry laid processing is typically more suitable for the production of highly porous media including bundles of glass fibers.

It should be appreciated that the filter media may include other parts in addition to the fiber web described herein. In some embodiments, further processing includes incorporation of one or more structural features and/or stiffening elements. For instance, the media may be combined with additional structural features such as polymeric and/or metallic meshes. In one embodiment, a screen may be disposed on the filter media upstream and/or downstream, providing for further stiffness. In some cases, a screen backing may aid in retaining the pleated configuration. For example, a screen backing may be an expanded metal wire or an extruded plastic mesh.

As previously indicated, the filter media disclosed herein can be incorporated into a variety of filter elements for use in various applications including hydraulic and non-hydraulic filtration applications. Exemplary uses of hydraulic filters (e.g., high-, medium-, and low-pressure filters) include mobile and industrial filters. Exemplary uses of non-hydraulic filters include fuel filters (e.g., automotive fuel filters), oil filters (e.g., lube oil filters or heavy duty lube oil filters), chemical processing filters, industrial processing filters, medical filters (e.g., filters for blood), air filters, and water filters. In some embodiments, a number of layers of filter media may be wrapped around an inner substrate (e.g., a synthetic or metal core) to form a wrapped filter. For example, a wrapped filter may include between 5 and 10 layers of filter media wrapped around the inner substrate. In some cases, filter media described herein can be used as filter media for coalescing applications (e.g., using a wrapped filter). For example, such filter media may be used to remove oil from compressed air, or to remove water from fuel.

The filter elements may have the same property values as those noted above in connection with the filter media. For example, the above-noted resistance ratios, basis weight ratios, dust holding capacities, efficiencies, specific capacities, and fiber diameter ratios between various layers of the filter media may also be found in filter elements.

During use, the filter media mechanically trap particles on or in the layers as fluid flows through the filter media. The filter media need not be electrically charged to enhance trapping of contamination. Thus, in some embodiments, the filter media are not electrically charged. However, in some embodiments, the filter media may be electrically charged.

EXAMPLES

The following examples are intended to illustrate certain embodiments of the present invention, but are not to be construed as limiting and do not exemplify the full scope of the invention.

Examples 1 and 2

Two examples (examples 1 and 2) of filter media including a blend of microglass and lyocell fibers were produced and compared with a conventional filter media example having no lyocell fibers (conventional). The processes of forming the filter media were as follows. In examples 1 and 2, microglass fibers and lyocell fibers were stored separately, processed through a pulper and then mixed together in a wet laid process to form an aqueous-based fiber slurry. Microglass fibers within the slurry made up 80% by weight of the fiber web and lyocell fibers within the slurry made up 20% by weight of the fiber web. The lyocell fibers had a CSF level of fibrillation of about 270. In the conventional example, no lyocell fibers were added.

The temperature of the fiber glass slurry was maintained to be about room temperature. An acrylic binder was injected into the slurry prior to flowing the slurry into the headbox, forming a precipitate on the fibers. The slurry was subsequently pumped into the headbox. Through the addition of sulfuric acid, the pH of the slurry was adjusted to about 3.5. The slurry was collected, dried and formed into a filter media. Performance characteristics of the filter media were measured with the Multipass Filter Test using 10 micron particles. From the multipass filter test, the stability of the beta efficiency ratio of the filter media was measured over time along with the dust holding capacity. Mechanical characteristics of the filter media were also assessed, including elongation and burst strength, using the elongation and burst strength tests discussed previously. Properties of the filter media for Examples 1 and 2 and the conventional glass fiber filter media are provided in FIGS. 1-4.

As shown in FIG. 1, the beta efficiency ratio of the filter media for Examples 1 and 2 was observed to continually increase over the entire course of the multipass filter test, indicating the filter media has a high degree of stability of efficiency. The beta efficiency ratio of the conventional glass fiber filter media without lyocell, in contrast, was observed to decrease after 60% of the time period in which the multipass filter test was administered.

Figure 2:
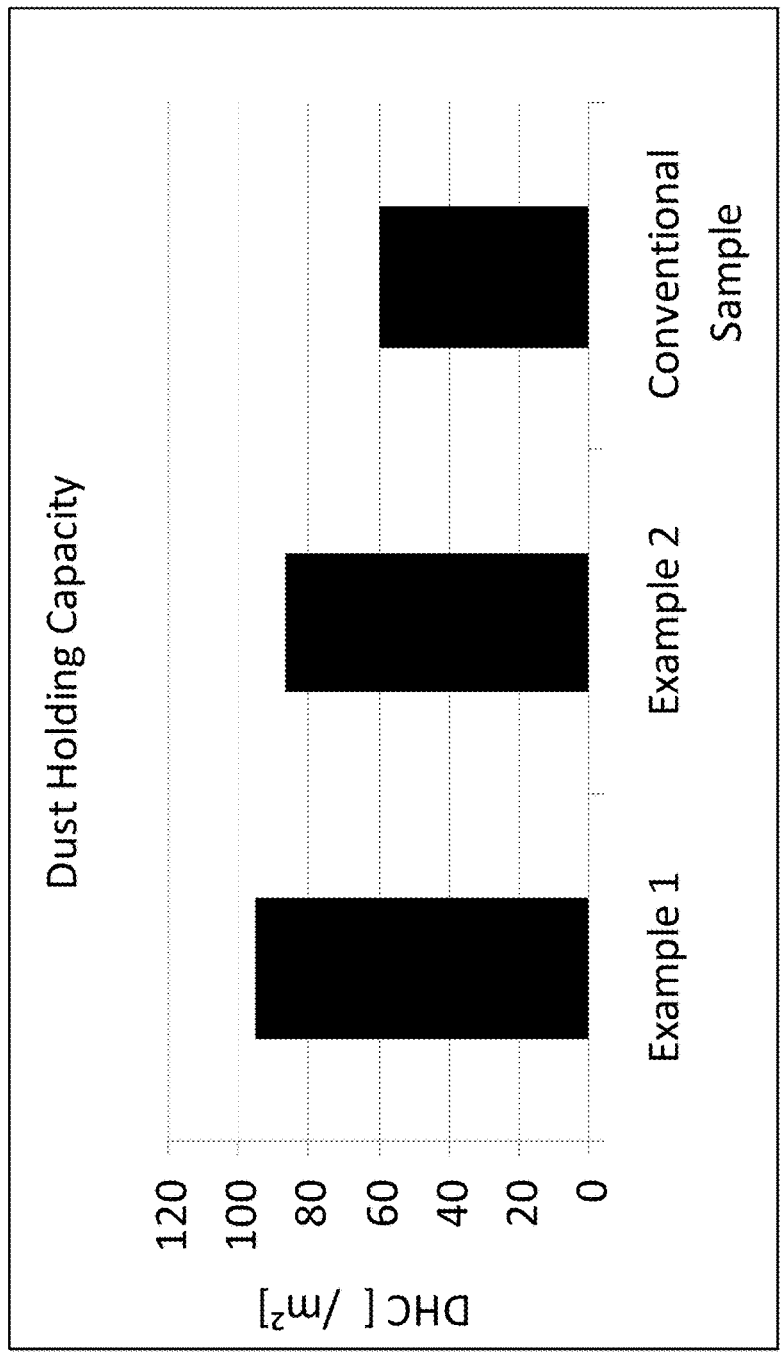
FIG. 2 depicts dust holding capacity measurements for Examples 1 and 2 and a conventional glass fiber filter media.

FIG. 2 illustrates the dust holding capacity of the filter media measured for Examples 1 and 2 and the conventional glass fiber filter media according to the Multipass Filter Test. The DHC of the filter media was observed to be greater for Example 1 (95.3 g/m$^2$) and for Example 2 (86.6 g/m$^2$) than the DHC observed for the conventional glass fiber filter media without lyocell (59.5 g/m$^2$).

Figure 3:
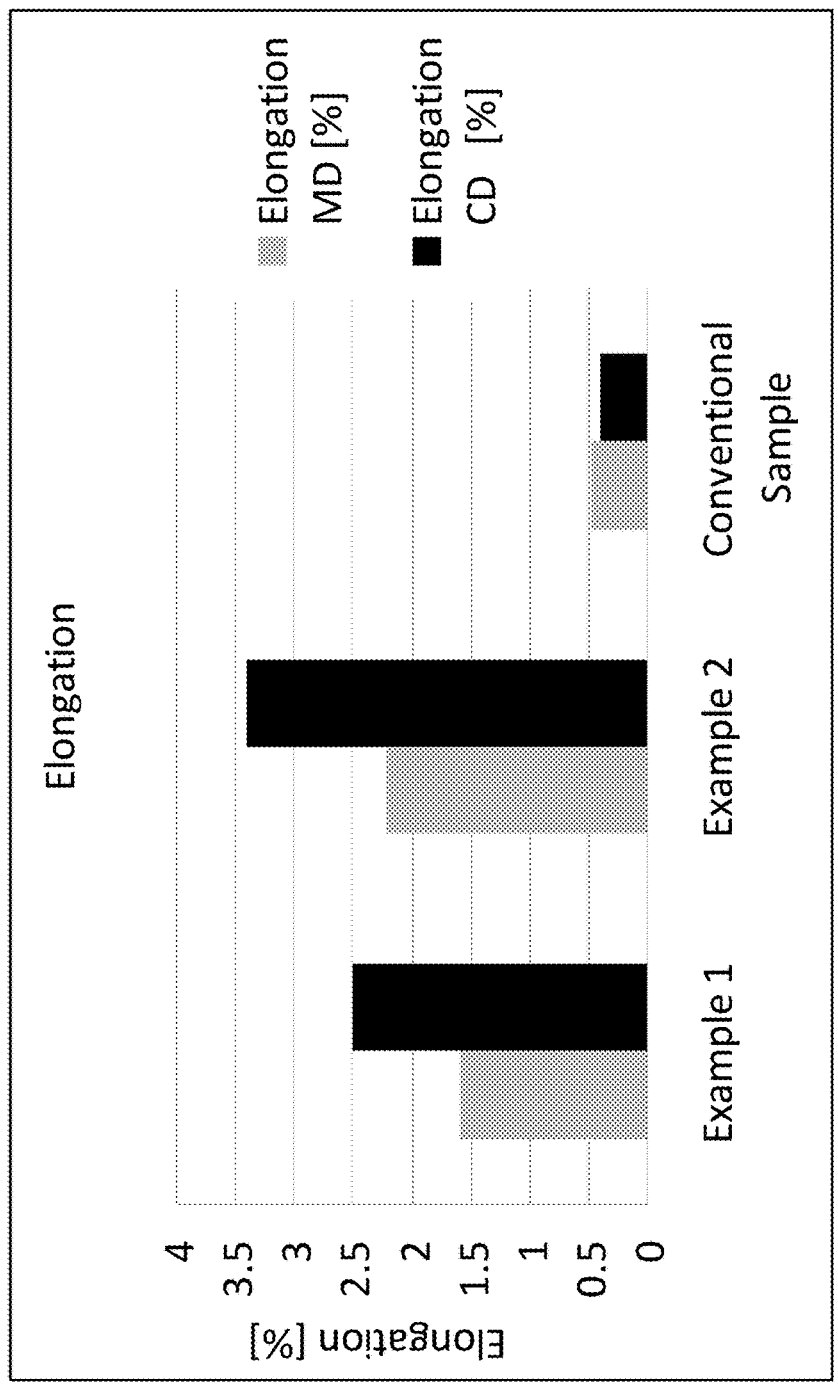
FIG. 3 depicts elongation measurements for Examples 1 and 2 and a conventional glass fiber filter media.

FIG. 3 illustrates the elongation of the filter media measured in both the machine direction and the cross-machine direction. For both Examples 1 and 2, the elongation of the filter media in both the machine direction and the cross-machine direction was observed to be greater than 1.5%. In contrast, the elongation of the conventional glass fiber filter media without lyocell in both the machine direction and the cross-machine direction was measured to be less than 0.5%.

Figure 4:
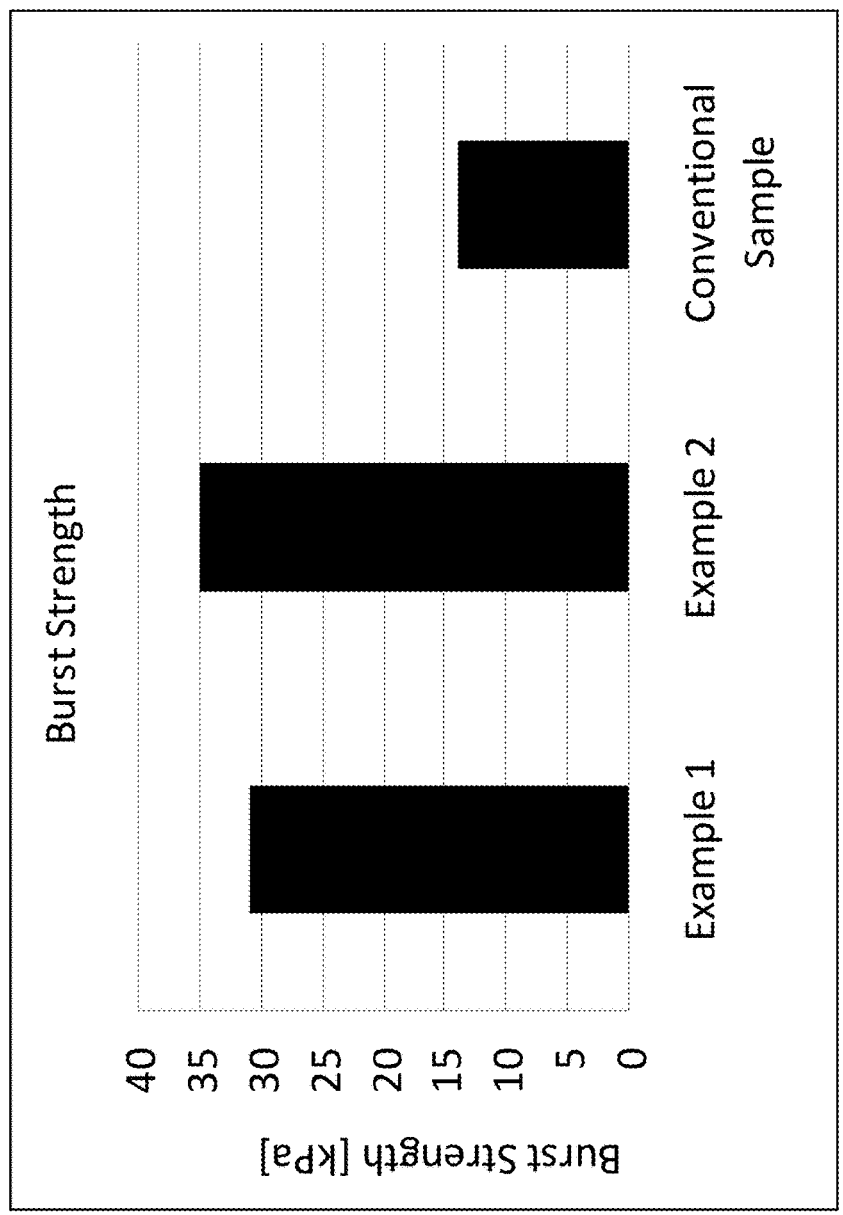
FIG. 4 depicts burst strength measurements for Examples 1 and 2 and a conventional glass fiber filter media.

FIG. 4 depicts the burst strength measured of the filter media for Examples 1 and 2. The burst strength of the filter media was measured to be greater than about 30 kPa. The burst strength of the conventional glass fiber filter media without lyocell was measured to be about 14 kPa.

Example 3

Six separate filter media were manufactured as handsheets where each of the filter media incorporated lyocell having different levels of fibrillation. The CSF level of fibrillation for the lyocell of each filter media handsheet was 45, 240, 270, 600, 660 and 850 (corresponding to a SR level of fibrillation of 83, 46, 42, 20, 17 and 9, respectively). A CSF of 850 refers to an unrefined level of fibrillation.

Microglass fibers and lyocell having a respective level of fibrillation were mixed together to form aqueous-based fiber slurries. Microglass fibers made up 80% by weight of the fibers within each slurry and lyocell fibers made up 20% by weight of the fibers within each slurry. Sulfuric acid was added to acidify each slurry. Each fiber slurry was then drained, collected, formed and dried into a respective handsheet having lyocell having a particular level of fibrillation. Each handsheet had a basis weight of 60 g/m$^2$.

Figure 5:
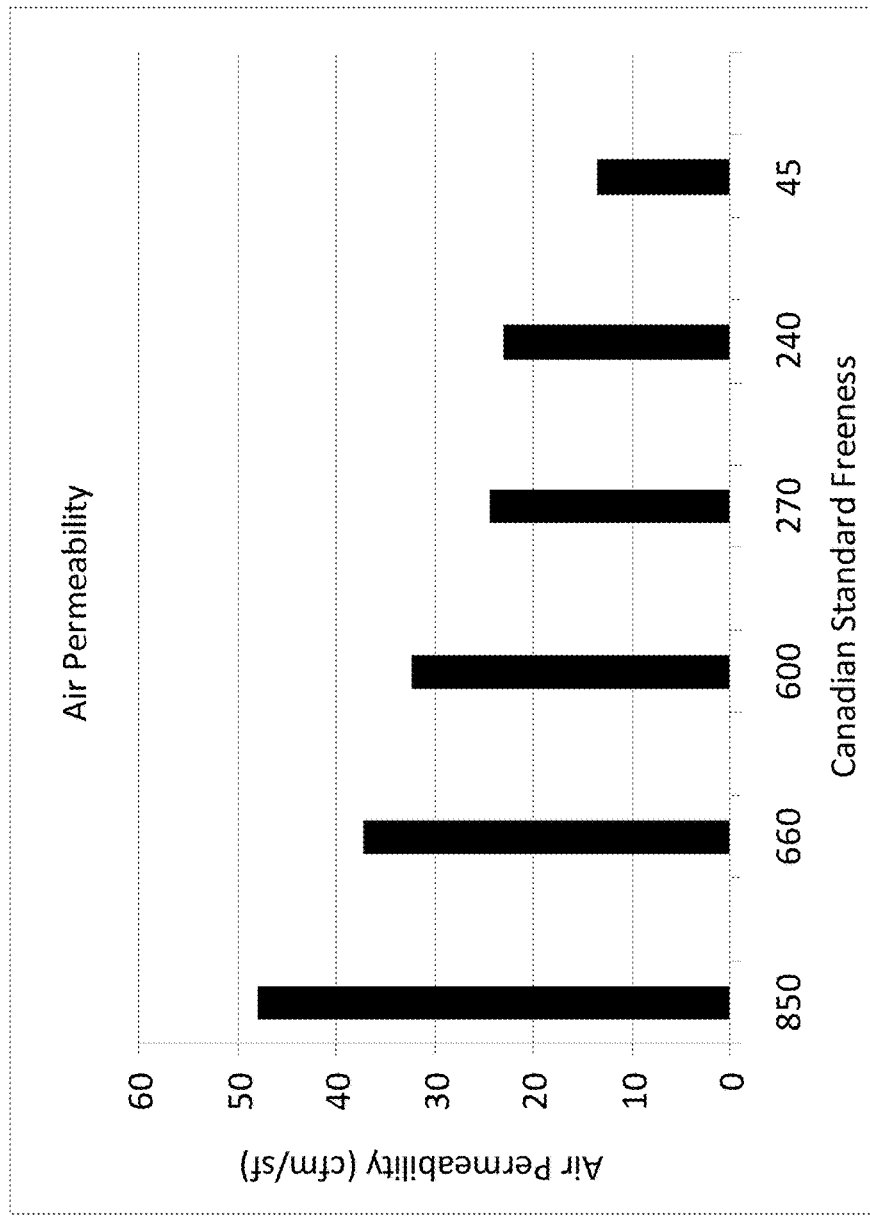
FIG. 5 depicts air permeability measurements for handsheets having lyocell with varying levels of fibrillation.
Figure 6:
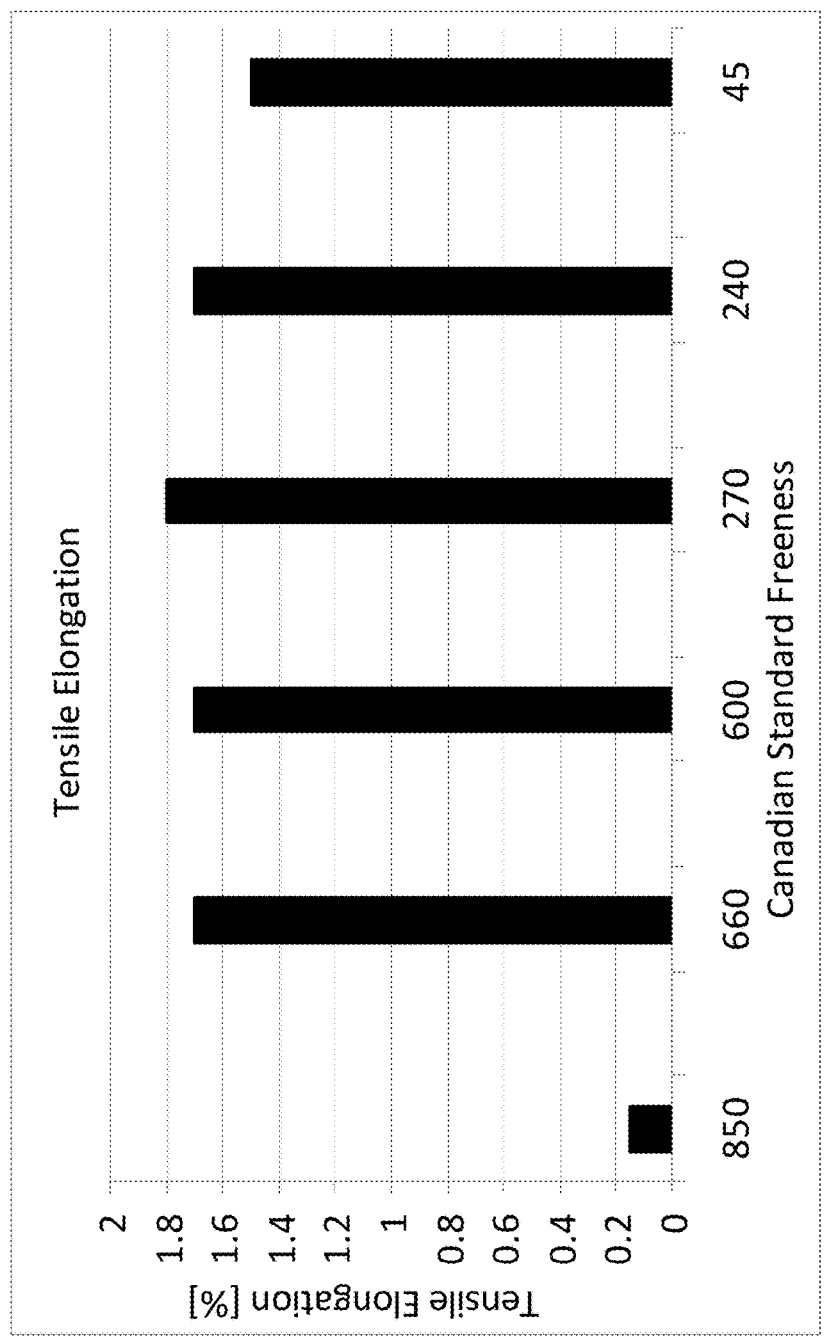
FIG. 6 depicts tensile elongation measurements for handsheets having lyocell with varying levels of fibrillation.
Figure 7:
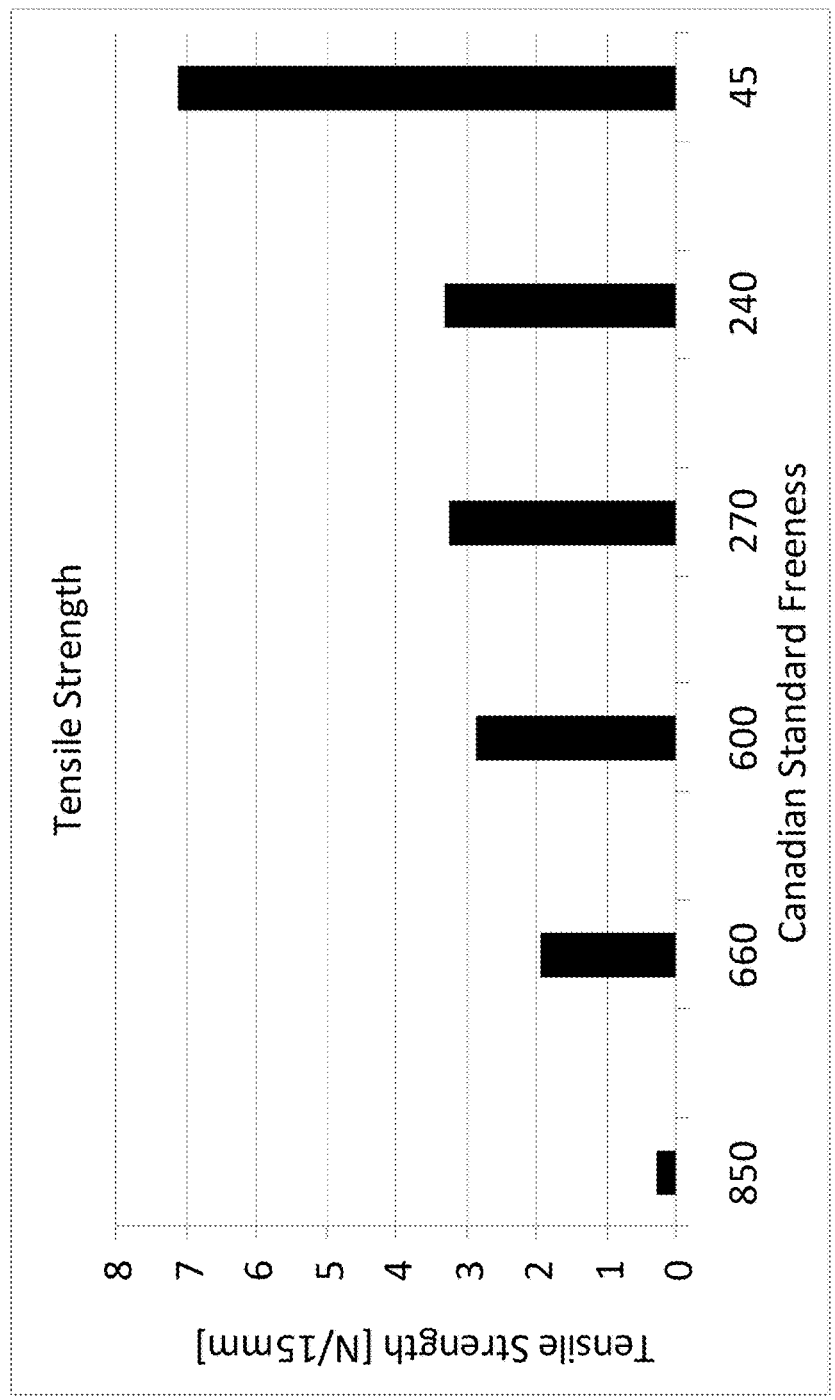
FIG. 7 depicts tensile strength measurements for handsheets having lyocell with varying levels of fibrillation.

The air permeability of each filter media was measured for each of the handsheets using the permeability test described above and recorded as shown in FIG. 5. Tensile elongation and tensile strength of each filter media were also assessed for each of the handsheets with the results shown in FIGS. 6 and 7.

The air permeability of the handsheet having lyocell fibers with an unrefined level of fibrillation (CSF 850) was observed to exhibit the greatest air permeability while the air permeability of the handsheet with lyocell fibers with the most refined level of fibrillation (CSF 45) was observed to be the least permeable. Accordingly, handsheets with lyocell fibers having CSF levels of fibrillation that are above CSF 45 exhibited generally favorable performance characteristics of air permeability.

It was observed that the tensile elongation and tensile strength for handsheets having lyocell fibers with an unrefined level of fibrillation (CSF 850) was significantly lower than that measured for handhseets having lyocell fibers with an increased level of fibrillation. As such, handsheets with lyocell fibers having CSF levels of fibrillation that were lower than CSF 850 exhibited generally more beneficial mechanical characteristics, as measured through tensile strength and tensile elongation. Handsheets with lyocell fibers having CSF levels of fibrillation that were between CSF 45 and CSF 850 also exhibited generally more favorable properties of tensile elongation than that observed for handsheets having lyocell fibers with fibrillation levels of CSF 45 and CSF 850. As illustrated, handsheets having lyocell fibers having CSF levels of fibrillation at CSF 660, CSF 600, CSF 270 and CSF 240 exhibited a combination of mechanical properties and air permeability that were more favorable than handsheets having lyocell fibers fibrillated at CSF 850 and CSF 45.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A filter media comprising:
a fiber web including glass fibers and fibrillated fibers, the fiber web having a basis weight of between about 10 and about 1000 g/m$^2$ and a thickness of between about 0.10 mm and about 50.0 mm, wherein the average Canadian Standard Freeness level of fibrillation of the fibrillated fibers is between 100 and 850, wherein the fiber web has a mean flow pore size of between about 5 microns and 20 microns.

2. The filter media of claim 1, wherein the average Canadian Standard Freeness level of fibrillation is between about 100 and about 600.

3. The filter media of claim 1, wherein the average Canadian Standard Freeness level of fibrillation is between about 200 and about 400.

4. The filter media of claim 1, wherein the fibrillated fibers comprise between about 5% and about 60% by weight of the fiber web.

5. The filter media of claim 1, wherein the fibrillated fibers comprise between about 5% and about 30% by weight of the fiber web.

6. The filter media of claim 1, further comprising synthetic fibers.

7. The filter media of claim 1, wherein the glass fibers comprise between about 40% and about 90% by weight of the fiber web.

8. The filter media of claim 1, wherein the glass fibers comprise chopped strand fibers, wherein the chopped strand fibers comprise less than about 30% by weight of the fiber web.

9. The filter media of claim 1, wherein the glass fibers comprise microglass fibers, wherein the microglass fibers comprise between about 40% and about 90% by weight of the fiber web.

10. The filter media of claim 1, wherein the fiber web has a tensile elongation in a cross-machine direction of greater than about 1% and a tensile elongation in a machine direction of greater than about 0.8%.

11. The filter media of claim 1, wherein the fiber web has a Schopper burst strength of greater than about 15 kPa.

12. The filter media of claim 1, wherein the fiber web has a tensile strength in a cross-machine direction of greater than about 3 N/15 mm and a tensile strength in a machine direction of greater than about 4 N/15 mm.

13. The filter media of claim 1, wherein the fiber web comprises a beta efficiency ratio of greater than about 200 for particles having an average diameter of greater than about 3 microns.

14. The filter media of claim 1, wherein the fiber web has an air permeability of between about 2 cfm/sf and about 215 cfm/sf.

15. The filter media of claim 1, wherein the fiber web comprises a beta efficiency ratio that increases or remains constant over greater than 60% of an entire test period in which the fiber web is subject to a multipass filter test.

16. A filter element comprising the filter media of claim 1.

17. A hydraulic filter element comprising the filter media of claim 1.

* * * * *